March 11, 1930.  F. J. STRAUB ET AL  1,749,962
GEAR SHIFTING MECHANISM
Filed March 22, 1928  4 Sheets-Sheet 1

INVENTORS
Francis J. Straub
Joseph F. Weinziarl
by C. M. Clarke Atty.

March 11, 1930.  F. J. STRAUB ET AL  1,749,962
GEAR SHIFTING MECHANISM
Filed March 22, 1928   4 Sheets-Sheet 3

INVENTORS
Francis J. Straub
Joseph J. Weinzierl
by C. M. Clarke
atty

INVENTORS
Francis J. Straub
Joseph F. Weinzierl
by C. M. Clarke
atty.

Patented Mar. 11, 1930

1,749,962

UNITED STATES PATENT OFFICE

FRANCIS J. STRAUB AND JOSEPH T. WEINZIERL, OF NEW KENSINGTON, PENNSYLVANIA

GEAR-SHIFTING MECHANISM

Application filed March 22, 1928. Serial No. 263,694.

Our invention relates to an improvement in gear shifting mechanism for motor-driven vehicles, and has for its object to provide means for the prevention of undesirable back movement or travel of the vehicle under gravity.

Ordinarily, when such a vehicle as an automobile becomes stalled on a hill, or is being started up-grade from a stationary position, it is difficult to promptly shift the gears without, at the same time, utilizing the ordinary brake equipment, requiring considerable skill and experience for successfully obviating the gravity tendency and for smoothly imparting driving power from the engine to the gears.

Our invention contemplates the application to the usual or standard gear shift and secondary drive shaft, coupled with the engine through its clutch mechanism, of automatically operative interlocking means subject to the control of a supplemental brake operatively connected with and controlled by the gear shift mechanism, to act to hold the car against reverse or back movement when the transmission is in either neutral, low, second, or high gear positions.

Ordinarily, when a motor vehicle is stopped on an up-grade, starting is made difficult by the necessity of releasing the brakes at the same time the engine picks up the load when the clutch is thrown in. Unless the driver is experienced and careful, an accident may occur if the vehicle gets beyond control and descends the grade backwardly.

The prevention device of this application permits free forward movement of the vehicle, but checks automatically any such backward movement. Likewise, in the case of an engine stalling in an attempt to start the vehicle, such undesired backward movement is prevented by the device engaging or becoming operative upon an initial backward movement.

By interlinking or connecting the controlling mechanism with the usual gear shifting lever, the device becomes automatically inoperative when it is desired to reverse the vehicle, and again operative when the gear shifting lever is in any other position than reverse.

In our prior Patent No. 1,650,396, we have shown a non-reversing device in which the brake drum of the over-running clutch is held by a brake-band under spring pressure. The brake-band is released by the shift into reverse gear rotating a spreader cam which has right and left-hand helical faces on opposite sides. The original brake mechanism included a tension bolt, passing through the side cams, on which are mounted the compression spring, the spreader cam, and radius links for holding the bolt in the correct fore-and-aft position.

The present improvement makes use of a longitudinally movable wedging member, either sliding or roller bearing, instead of the helical faced spreader cam, and the tension bolt is replaced by a clamp-like member similar in shape to an elongated C clamp. On one end of such clamp is preferably incorporated a manual release which disengages the brake-band independent of the shift into reverse gear by the operation of a rod projecting through the floor boards.

In the accompanying drawings, showing certain preferred embodiments of the invention:

Figure 2:
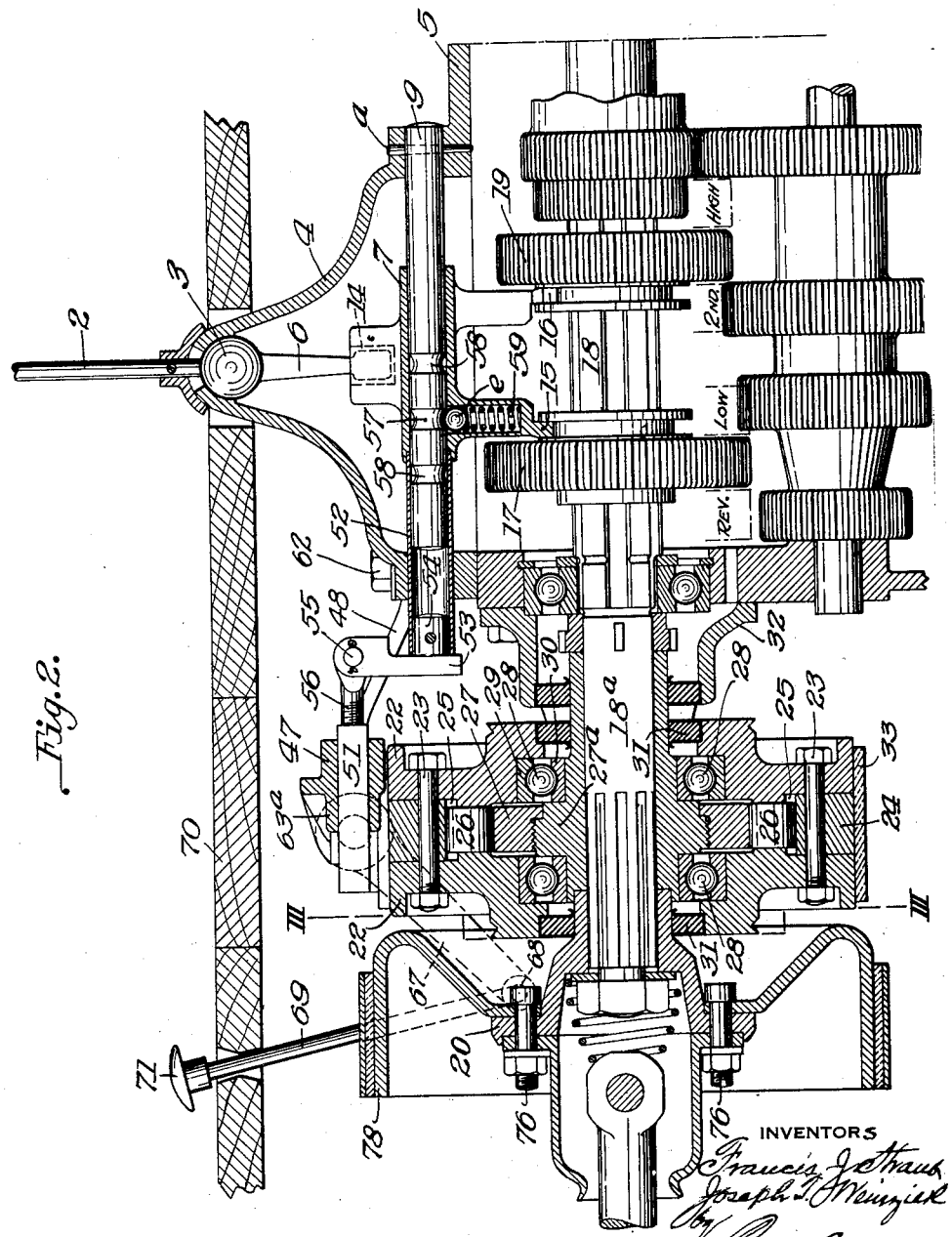
Fig. 2 is a longitudinal vertical sectional view on the line II—II of Fig. 1.
Figure 4:
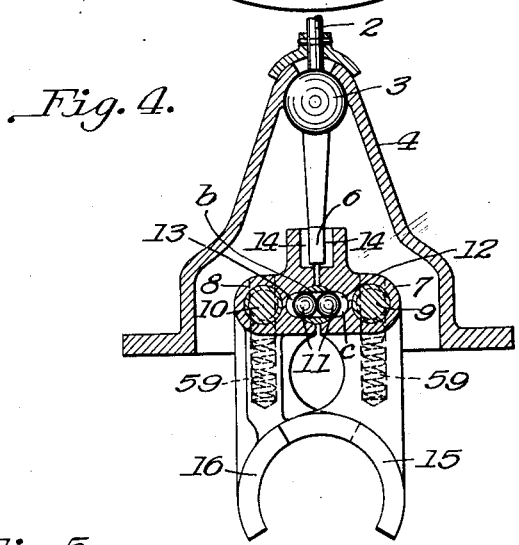
Fig. 4 is a similar view on the line IV—IV of Fig. 1.

Referring to Figs. 2 and 4, 2 is the usual standard gear shift lever mounted by its spherical bearing 3 in the supporting casing or housing 4 above the usual transmission casing 5.

An extension 6 of lever 2 projects downwardly between the shifting blocks or forks 7 and 8, and is adapted to actuate one or the other in the same general manner as described in our prior patent noted. In the present construction, the blocks 7 and 8 are slidably mounted on the rods 9 and 10 which are now fixedly mounted in the casing 4 in any suitable way, as by pins $a$.

An additional rod $b$ is fixedly located between rods 9 and 10, similarly mounted in the casing, providing a slide mounting and guiding means for the blocks 7 and 8, each of which has a half-round bearing thereon, as in Fig. 4. Rod $b$ also provides for interlocking connection with one or the other of the shifting blocks 7 and 8 when one is shifted, to hold the other. For such purpose, rod $b$ is drilled across through its middle, providing a transverse socket $c$ for a pair of interlocking balls 11 adapted to engage either socket 12 or 13 in block 7 or 8 so as to hold one of the blocks against movement when the other is shifted.

Thus, upon movement of either block, half-round socket 12 or 13 will ride over the adjacent ball 11, forcing it across against the other ball which then fills the opposite socket, locking its block against movement until the actuated block is again shifted back to registering or neutral position. In such neutral position, Fig. 1, the terminal 6 of the shift lever is half-way between the blocks, each of which is provided with a recess 14 of a depth sufficient to receive the full width of terminal 6 when shifted to the right or left.

By such construction, the upper end of the lever may be thrown to the left, with corresponding thrusting of the terminal 6 to the right, and by forward movement of the handle of the lever, block 7 will be thrown rearwardly for reverse. In the same lateral position and with a reverse direction, block 7 will be thrust forwardly for low gear engagement.

Upon coming again to neutral, the hand lever being thrown to the right will engage socket 14 of block 8 and forward movement of the hand lever will thrust said block backwardly for second gear engagement, with accomplishment of high gear position by reversal of the hand lever backwardly, as in our former patent.

Each of said blocks 7 and 8 is provided with a downwardly extending groove engaging gear shifting arm 15 and 16 respectively. Fork 15 of block 7 operates to shift gear 17 of secondary shaft 18 from neutral forward into low gear or backward into reverse gear positions, as indicated in dotted lines, Fig. 2. Likewise, fork 16 of block 8 operates to shift gear 19 from neutral position backward into second gear and forward into high gear positions, as indicated.

It will be understood that secondary shaft 18 of the transmission is fluted and in driving engagement with shift gear 17 by the usual keyways, and operates when thrust into usual gear engagement with the usual countershaft gears, as generally understood, without further necessary dscription.

The gear shift or transmission mechanism above described is within the interior of the usual transmission case 5, beyond which extends the secondary shaft extension $18^a$, upon which is mounted the brake-drum 22 and its cooperating mechanism for effecting the functions of the invention, as controlled by the gear shift mechanism. Splined on the end of shaft $18^a$ is the usual universal joint flange 20 for coupling connection with the universal joint and propeller shaft by bolts 76, for rear axle drive connection.

The usual shaft brake-drum 78 is also secured by its flange and bolts 76 to coupling 20, for braking action by the surrounding brake-band as in Fig. 2.

It will be understood that, ordinarily, with the gears in neutral, unless the usual foot brake or emergency brake is applied, gravity will effect reverse movement of secondary shaft 18 and $18^a$ in backing down hill.

It is the purpose of the present invention to provide means for automatically checking and holding the secondary shaft against such gravity-induced reverse movement under all conditions not controlled by the usual brakes until the transmission is in low or other gear moving forward, and independent of the reverse gear position and movement.

The mechanism is, therefore, designed to hold the car against backward movement on grades until it commences to move forward, and to be inoperative during ordinary backing.

This is accomplished by means of the brake-drum, normally gripped by a spring-tightened band in all positions except positive reverse movement under power, and acting through interlocking mechanism between the brake-drum and shaft extension $18^a$ to prevent its reversal under the conditions mentioned.

The brake-drum is composed of two halves 22 between which is held, by bolts 23, the cam ring 24 having an inner annular series of sockets 25. These are of well known construction, providing a rising or binding face at one end and a widening or releasing cavity at the other, annularly of the cam ring, for reception of a series of co-acting rollers 26. Opposing said rollers, and providing an annular concentric bearing therefor, is a sleeve or bushing 27, firmly screwed or otherwise secured to the hub $27^a$. The latter is in splined connection with shaft $18^a$ and with its bushing or hub ring 27 forms the rotatable bearing against which the rollers 26 are forced by the taper of the pockets 25 of the cam ring 24 when the over-running clutch acts. The peripheries of sides 22 and cam ring 24 are turned down flush providing a continuous annular brake-band surface.

Annular ball or roller bearings 28 are preferably arranged at each side of the binding roller trackway, mounted in suitable bearing rings 29, 30, of halves 22 and hub 27ª respectively. Oil retaining washers 31 in pressed metal cups are pressed in the hubs of the case or drum halves 22 to retain lubricant in the over-running clutch.

As thus arranged, shafts 18 and 18ª are free to rotate in the usual direction, but will be immediately locked upon reverse movement, assuming the compound drum 22—24 is held against rotation. When the drum is released, it is in a floating condition, so that the interlocking rollers 26 may function without acting to effect braking control on the car.

Figure 3:
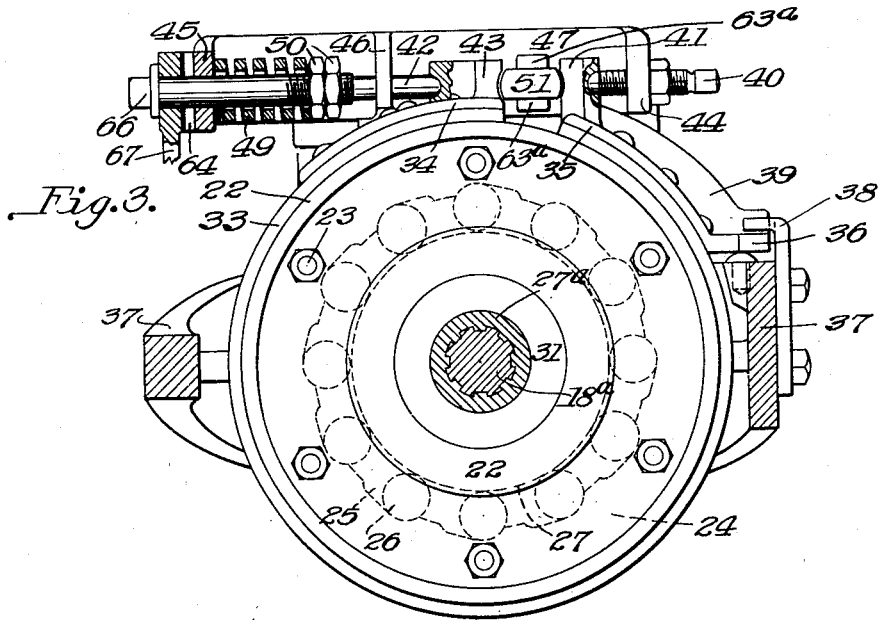
Fig. 3 is a cross section on the line III—III of Fig. 2.

For the purpose of either holding or releasing the brake-drum under the conditions of operation, providing for free or locked condition of the shaft, as desired, a brake-band 33 surrounds the drum having terminals 34 and 35. Extending rearwardly from bearing retainer 32 of casing 5 at each side is the double-sided brake anchor 37, upon which a bearing stud thereof, the flanged end 36 of terminal 35 bears. For the purpose of retaining the brake-band in position, the slotted terminal of an angle bracket 38, secured to anchor 37, fits over the middle rib 39 of terminal 35, as in Figs. 1 and 3. By such means, the brake-band is held in position while allowing free movement in adjusting it to the brake-drum periphery.

The brake-band 33 normally grips the drum 22—24, holding it rigidly and maintaining as opposing interlock against reverse movement of shaft 18ª. The brake-band terminals are maintained in contracted condition by opposing inward resilient and adjustable pressure against their terminals 34, 35, and are separated for loosening by interposed wedge mechanism. For such purpose, we utilize an adjusting set screw 40 engaging against a socketed lug 41 of terminal 35 and a resiliently mounted pressure pin 42 engaging the other side or socketed lug 43 of terminal 34, in the same way.

Figure 1:
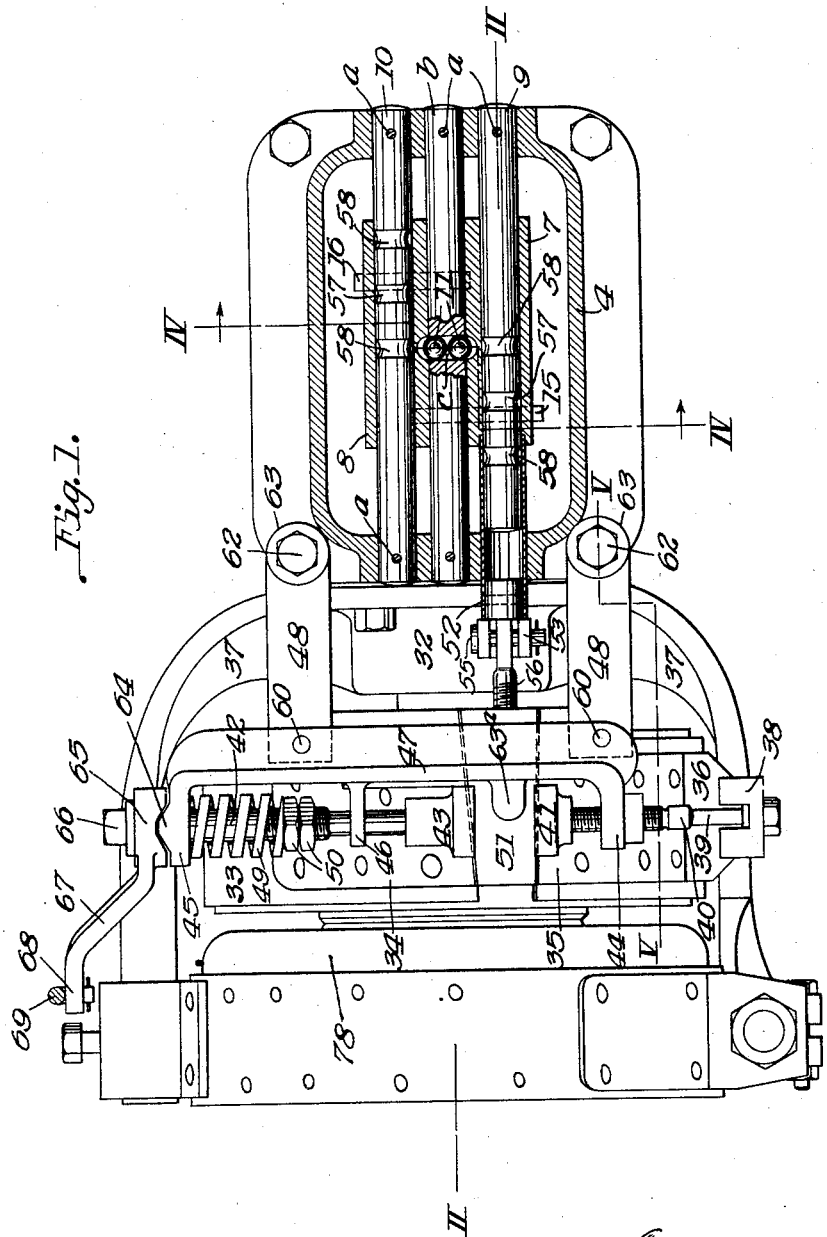
Fig. 1 is a plan view, partly in horizontal section, showing the gear shift mechanism in operative position with the brake controlled interlocking mechanism.
Figure 5:
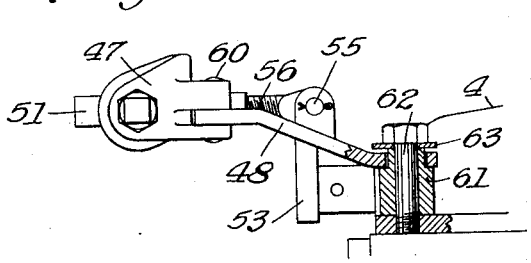
Fig. 5 is a sectional detail view on the line V—V of Fig. 1.

Set screw 40 is threaded through the end 44 and bolt 42 is slidably mounted in similar end and intermediate bearings 45, 46, of a C-shaped clamping yoke 47. The yoke is connected by links 48 with the gear casing 5 or its cover 4, as shown in Figs. 1 and 5.

A coiled spring 49 between bearing 45 and adjusting nuts 50 exerts the desired amount of inward pressure for clamping the band, assisted and regulated by the adjustment of screw 40.

The inner faces of lugs 41 and 43 provide bearings for an intervening spreading wedge 51 adapted in neutral position to be normally retracted free of spreading engagement with the lugs, but on power being supplied for backward movement of the vehicle, to wedge the lugs apart, releasing the brake-band. Such latter condition exists only in reverse.

In all other positions, to wit, neutral, low, second and high, the spreading wedge 51 is normally out of spreading contact with the lugs and they are drawn together by spring 49, gripping the drum 22—24.

As shown, the main wedging taper is provided on the inner face of the spring pressed lug 43 and the adjacent face of the wedge 51. The opposite face of the wedge and of its coacting lug 41 are practically parallel with the wedge center, or in non-wedging relation.

The wedge 51 is inserted for spreading of the brake-band only in connection with movement of shifting block 7 and yoke 15 to move gear 17 to reverse position. For such purpose, block 7 has an extended tube 52, telescoped around rod 9 and extending backwardly through casing 4 and provided with a pushing and pulling connection with the wedge. Such connection consists of a clevis 53 having a lug 54 secured in the end of the tube and joined by pin 55 with an adjusting threaded stem 56 screwed into the wedge.

For the purpose of holding each shifting block and its fork in shifted position until positively changed, each rod 9 and 10 is provided with a neutral groove 57 and oppositely spaced grooves 58 for holding the block 7 in reverse and low positions, and the block 8 in second and high gear positions respectively.

For such purpose, each yoke is provided with a socket containing a ball $e$ and a seating spring 59. As the block and yoke are shifted to either position along rod 9 or 10, the ball will be seated in the particular registering groove 58 of holding rod 9 or 10 and will hold its position until the gear is shifted.

It is desirable that clamping frame 47 shall be held in position with a degree of looseness for both lateral and vertical movement, to compensate for any variations in clamping the drum by the brake-band and its wedging mechanism. For such purpose, the radius bars 48 are pivoted to frame 47 by pins 60 and to rounded terminals of sleeves 61 with sufficient looseness for ample movement. Sleeve 61 is secured to casing 4 by stud bolt 62 and washer 63 spaced beyond the end of bar 48, as in Fig. 5.

Such connections allow the radius bars to hinge on the sleeve both vertically and laterally, but with very slight fore-and-aft movement.

Clamp bar 47 is provided with the transverse opening shown for slidable support of the wedge 51 and under and upper lugs 63ª further support and guide the wedge in case it is pushed entirely through such slotted opening. The bar 47 is suitably reinforced by ribs, as shown, and particularly designed as to shape and compactness to facilitate its mounting below the floor boards of the car.

For the purpose of releasing the clamping band 33 independent of gear shifting, as when it is desired to move the vehicle without operating the engine, as by pushing, we provide an independent foot or hand operated mechanism.

Lug 45 of clamping frame 47 is provided at its outer portion with a cam extension 64. A co-acting cam 65 is pivotally mounted around the outer end of clamping bolt 42 by its bolt head 66 so that, when cam 65 is rotated, it will effect backward movement of the bolt against the pressure of spring 49 by nuts 50.

For such purpose, cam 65 is provided with a lever arm 67 to the lower end of which is pivoted at 68 the lifting rod 69 extending up through the floor 70 and provided with a terminal button 71. As rod 69 is lifted, the clamping band 33 will be released by cam action, effecting release of the drum in the same manner as by insertion of wedge 51, but independently thereof.

Figure 6:
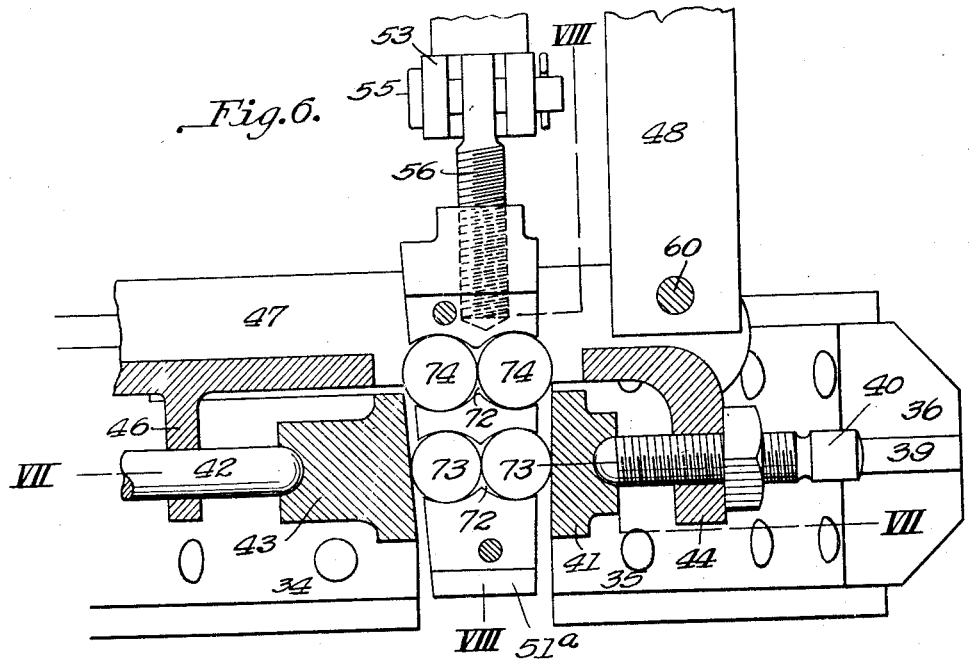
Fig. 6 is a horizontal detail sectional view on the line VI—VI of Fig. 7, showing a roller bearing wedging element for spreading the brake-band terminals.
Figure 7:
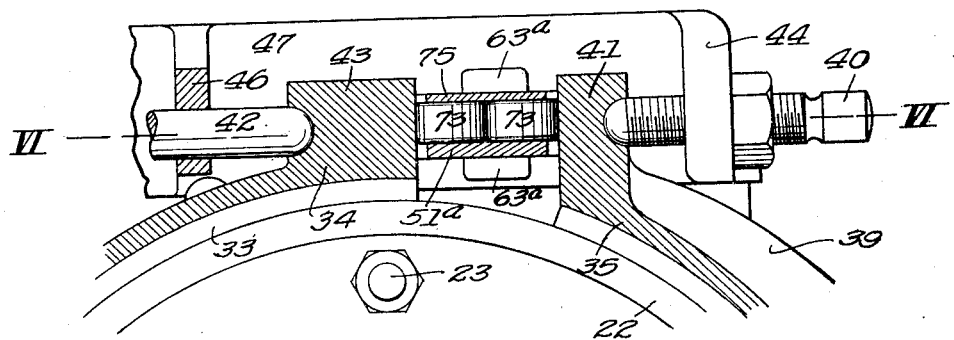
Fig. 7 is a vertical detail section on the line VII—VII of Fig. 6.
Figure 8:
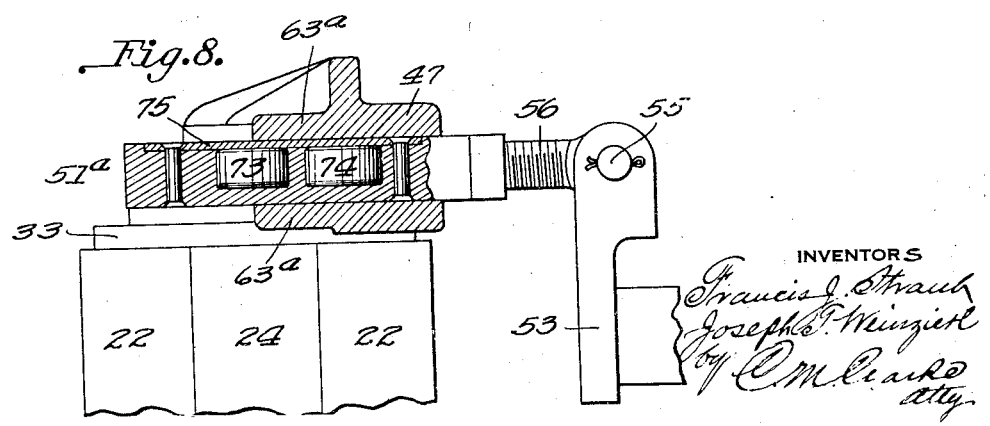
Fig. 8 is a similar section on the line VIII—VIII of Fig. 6.

In Figs. 6, 7 and 8, we show an alternative construction of wedging mechanism, in which rollers are utilized to decrease the friction when the wedge is forced between the brake-band terminals.

In such construction, wedge 51ª is provided with receiving pockets 72 in which are placed rollers 73 and 74, in pairs fore-and-aft, bearing against each other at the middle and extending beyond the edges of the wedge. As in the sliding wedge construction, the main taper is at the movable side of the clamping band only, so that, as the wedge is inserted by the same means as above described, it will effect separation without sticking or friction.

It will be noted that rollers 74 are slightly larger than the rollers 73, because of the increasing width of the wedge in the reverse direction of its movement.

A cover plate 75 is secured upon the top of the wedge by any suitable means, as rivets, for confining action of the rollers which, as shown, project beyond the sides for contacting engagement against the terminal lugs 41 and 43, their peripheries at each side being tangent to the wedge outlines.

While the construction as shown will give good results, it will be understood that a single pair of rollers, or balls may be utilized when properly mounted and inserted between the relatively tapering faces of the lugs, with good results.

The construction and operation of the invention will be readily understood from the foregoing description. When the compound drum 22—24 is locked against rotation by the normally tightened band 33, the inner member of the over-running clutch is free when the vehicle moves forward, but the rollers 26 of the clutch lock the parts together upon the slightest reverse movement of the secondary shaft of the transmission, as in backing by gravity.

The position of the spreading wedge is so adjusted by threaded connection 56 that the spring 49 effects clamping by the band at all times.

There is sufficient clearance between the wedge and the brake-band terminals so that there is no interference with the gripping of the band when the shift lever is in neutral or any of the forward speeds, but when the shift is made into reverse gear, the wedge is inserted, separating the clamping band, freeing the over-running clutch, and allowing it to turn in a clockwise direction while the vehicle is moving backward under power. As soon as the shift is made from reverse to neutral, the spring again tightens the brake-band and the overrunning clutch is again held against rotation.

What we claim is:

1. In change-speed mechanism for motor vehicles, a power imparting shaft having a shifting gear, means for shifting the gear, a brake-drum surrounding the shaft, releasable binding mechanism between the shaft and drum, a brake band surrounding the drum, means for tightening the brake band, and a transverse longitudinally movable separating wedge connected with the gear shifting means for loosening the brake band.

2. In change-speed mechanism for motor vehicles, a power imparting shaft having a shifting gear, means for shifting the gear, a brake-drum surrounding the shaft, releasable binding mechanism between the shaft and drum, a brake band surrounding the drum having spaced-apart terminal abutments, means for tightening the brake band, and a transverse longitudinally movable separating wedge between the abutments connected with the gear shifting means.

3. In change-speed mechanism for motor vehicles, a power imparting shaft having a shifting gear, means for shifting the gear, a brake-drum surrounding the shaft, releasable binding mechanism between the shaft and drum, a brake band surrounding the drum having spaced-apart terminal abutments, means holding one of said abutments, a spring exerting inward pressure against the other abutment, and a transverse longitudinally movable separating wedge between the abutments connected with the gear shifting means.

4. In change-speed mechanism for motor vehicles, a power imparting shaft having a shifting gear, means for shifting the gear, a brake-drum surrounding the shaft having a series of locking and unlocking rollers and sockets therefor operable to grip the shaft in one direction and to release it in the opposite direction, a brake band surrounding the drum having spring contracted terminals, and a transverse longitudinally movable separating wedge connected with the gear shifting means for loosening the brake band.

5. In change-speed mechanism for motor vehicles, a power imparting shaft having a shifting gear, a shifting device therefor, a brake-drum surrounding the shaft, releasable binding mechanism between the shaft and drum, a brake band surrounding the drum having terminal lugs, an adjusting set screw for one of said lugs, a spring pressed bolt engaging the other lug, and means connected with the shifting device for spreading the lugs apart to loosen the band.

6. In change-speed mechanism for motor vehicles, a power imparting shaft having a shifting gear, a shifting device therefor, a brake-drum surrounding the shaft, releasable binding mechanism between the shaft and drum, a brake band surrounding the drum having terminal lugs, an adjusting set screw for one of said lugs, a spring pressed bolt engaging the other lug, and a transversely movable separating wedge between the abutments connected with the shifting device.

7. In combination with a shaft-holding brake-drum and a clamping band therefor having spaced-apart terminal lugs, a frame having at one end a screw engaging one of the lugs, a spring actuated stud at the other end engaging the other lug, and a wedge slidably mounted in the frame extending between the lugs.

8. In combination with a shaft-holding brake-drum and a clamping band therefor having spaced-apart terminal lugs, a frame having at one end a screw engaging one of the lugs, a spring actuated stud at the other end engaging the other lug, means for retracting the stud, and a wedge slidably mounted in the frame extending between the lugs.

9. In combination with a shaft-holding brake-drum and a clamping band therefor having spaced-apart terminal lugs, a frame having at one end a screw engaging one of the lugs, a spring actuated stud at the other end engaging the other lug, cam mechanism at one end of the frame provided with a lever for retracting the stud, a lifting rod for the lever, and a wedge slidably mounted in the frame extending between the lugs.

10. In combination with a shaft-holding brake-drum and a spring tightened clamping band therefor having spaced-apart terminal lugs, a frame surrounding the lugs having abutments opposing the outer sides of the lugs, a wedge slidably mounted in the frame extending between the lugs, and means connected with gear shift mechanism for inserting the wedge between the terminal lugs.

11. In combination with a shaft-holding brake-drum and a spring tightened clamping band therefor having spaced-apart terminal lugs, a frame surrounding the lugs having abutments opposing the outer sides of the lugs, a wedge slidably mounted in the frame extending between the lugs, means connected with gear shift mechanism for inserting the wedge between the terminal lugs, and means independent of the wedge for releasing spring tightening of the clamping band.

12. In combination with a shaft-holding brake-drum and a spring tightened clamping band therefor having spaced-apart terminal lugs, a frame surrounding the lugs having abutments opposing the outer sides of the lugs, a wedge member provided with lug engaging rollers slidably mounted in the frame extending between the lugs, and means connected with gear shift mechanism for inserting the wedge member between the terminal lugs.

In testimony whereof we hereunto affix our signatures.

FRANCIS J. STRAUB.
JOSEPH T. WEINZIERL.